United States Patent [19]
Tsujido

[11] Patent Number: 4,769,762
[45] Date of Patent: Sep. 6, 1988

[54] CONTROL DEVICE FOR WRITING FOR MULTI-WINDOW DISPLAY

[75] Inventor: Yoshinori Tsujido, Hyogo, Japan

[73] Assignee: Mitsubishi Denki Kabushiki Kaisha, Tokyo, Japan

[21] Appl. No.: 829,225

[22] Filed: Feb. 14, 1986

[30] Foreign Application Priority Data

Feb. 18, 1985 [JP] Japan .................................. 60-28192

[51] Int. Cl.⁴ .......................... G06F 3/14; G09G 1/06
[52] U.S. Cl. .................................... 364/521; 340/721; 340/716; 364/900
[58] Field of Search ........ 364/521, 518, 200 MS File, 364/900 MS File; 340/721, 716, 717, 750, 800, 801, 803

[56] References Cited

U.S. PATENT DOCUMENTS

| | | | |
|---|---|---|---|
| 4,559,533 | 12/1985 | Bass et al. | 340/724 |
| 4,598,384 | 7/1986 | Shaw et al. | 364/900 |
| 4,649,377 | 3/1987 | Urabe | 340/721 |
| 4,651,146 | 3/1987 | Lucash et al. | 340/721 |
| 4,653,020 | 3/1987 | Cheselka et al. | 364/900 |
| 4,670,752 | 6/1987 | Marcoux | 340/721 |
| 4,682,297 | 7/1987 | Iwami | 364/521 |

OTHER PUBLICATIONS

Kikuchi et al., "View Window Function by Mapping Memory", Toshiba Corporation, 1984, pp. 245-246.
Simizu et al., "Appraisal of Multi—Window Display System—I", Mitsubishi Electric Corporation, pp. 247-248.
Fukuoka et al., "Appraisal of Multi—Window Display—II", Mitsubishi Electric Corporation, pp. 249-250.

*Primary Examiner*—Gareth D. Shaw
*Assistant Examiner*—Kevin A. Kriess
*Attorney, Agent, or Firm*—Bernard, Rothwell & Brown

[57] ABSTRACT

In a control device for writing data for a multi-window display system having a function to simultaneously display a plurality of pictures on a display surface, there are provided a write controlling mapping buffer storing at corresponding addresses numbers of window display regions for the data to be written into a display frame memory, and a window identification number register provided with a window identification number for the data to be written. The data can be written into the display frame memory only when output of the write controlling mapping buffer and output of the window identification number register agree with each other.

3 Claims, 4 Drawing Sheets

CONTROL DEVICE FOR WRITING FOR MULTI-WINDOW DISPLAY

BACKGROUND OF THE INVENTION

1. Field of the Invention

The present invention relates to a control device for writing data into a display frame memory which is applied to simultaneous displaying of a plurality of pictures on a display surface of a computer system, or multi-window display.

2. Description of the Prior Art

FIGS. 4 and 5 illustrate hardware structure of the prior art display control devices for computer systems, wherein FIG. 4 is a block diagram showing an example employing a display controller. In the case of this structure, during a display cycle when some data on a display frame memory 1 is displayed on a desired display surface, a display controller 10 sends addresses for successive displays to the display frame memory 1 and the data to be displayed are loaded from the display frame memory 1 into a shift register 2 so as to be shifted thereby according to a display dot clock and output therefrom as video signals. And, during a write cycle when the data are written into the display frame memory 1, the display controller 10 sends the addresses where the data should be written in the display frame memory 1 and takes in the data once through an output control buffer 3, and, after processing the same in a predetermined manner, writes the same into the display frame memory 1.

FIG. 5 is a block diagram showing an example where a CPU 20 makes direct writing by the use of a display timing generator 4. In this case, during the display cycle, the display timing generator 4 sends addresses for displays to the display frame memory 1 in succession through an address multiplexer 5, and the data to be displayed are loaded from the display frame memory 1 into the shift register 2 so as to be shifted thereby according to a display dot clock and output therefrom as video signals. During the write cycle, the CPU 20 sends the addresses where the data should be written to the display frame memory 1 through the address multiplexer 5 and takes in the data once through the output control buffer 3, and, after processing the same in a predetermined manner, writes the same into the display frame memory 1.

In the prior art systems as respectively indicated in FIGS. 4 and 5, the processes for verifying addresses of windows in the multi-window displaying were all performed by means of software. Such software was complex so that the rate of processing speed was lowered.

SUMMARY OF THE INVENTION

The present invention makes it possible to simplify such prior art complex software in use for controlling writing for the multi-window system to a great degree just by an addition of a small number of hardware items.

In one embodiment of the invention, the control device for writing for a multi-window display system comprises a write controlling mapping buffer storing regional data about window display regions of the data written into the display frame memory during the write cycle and window identification numbers for the data to be written into the display frame memory are set, wherein agreement of the output data of the write controlling mapping buffer with the output data of the window identification number register is checked, and it is adapted such that, only when an agreement therebetween is detected, the data is written into the display frame memory.

In such writing control, an operation for writing data into other locations than the right display region is inhibited by the hardware means, and so the overall software is simplified and the processing can be made at a high rate of speed.

DETAILED DESCRIPTION OF THE PREFERRED EMBODIMENTS

Figure 1:
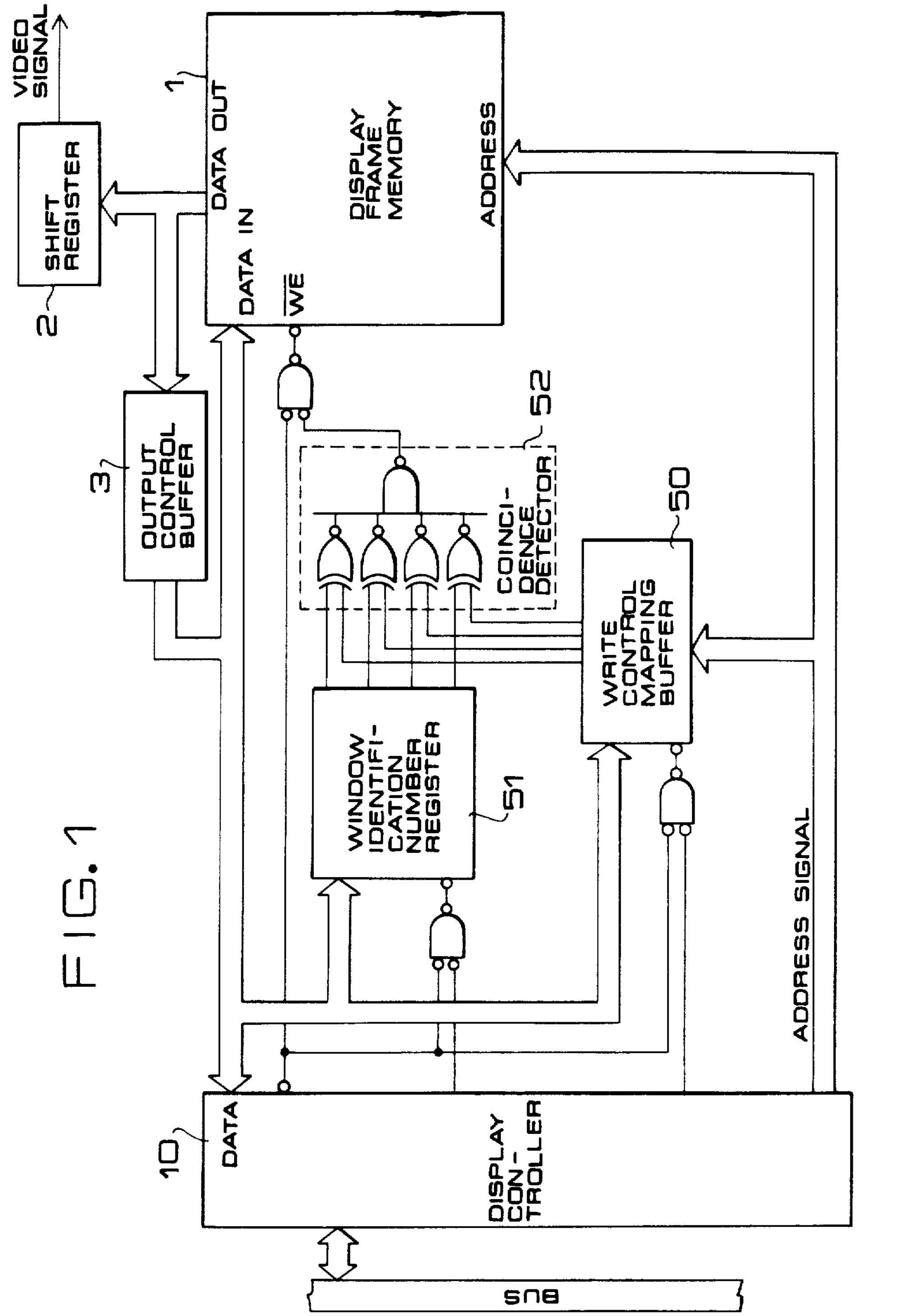
FIG. 1 is a block diagram showing a writing control device of the invention.

A preferred embodiment of the invention will be described with reference to accompanying drawings in the following. Referring to FIG. 1, reference numeral 10 denotes a display controller, 1 denotes a display frame memory for storing data to be displayed, 2 denotes a shift register for converting the contents of the display frame memory 1 into video signals, and 3 denotes an output control buffer. Further, 50 denotes a write controlling mapping buffer for controlling writing for multi-window displaying, in which addresses are adapted to be in correspondence with the displayed locations on the screen of the display frame memory 1. And, 51 denotes a window identification number register in which window numbers to be written are set, and 52 is a coincidence detector for detecting the coincidence of the output of the write controlling mapping buffer 50 with the output of the window identification number register 51.

Figure 4:
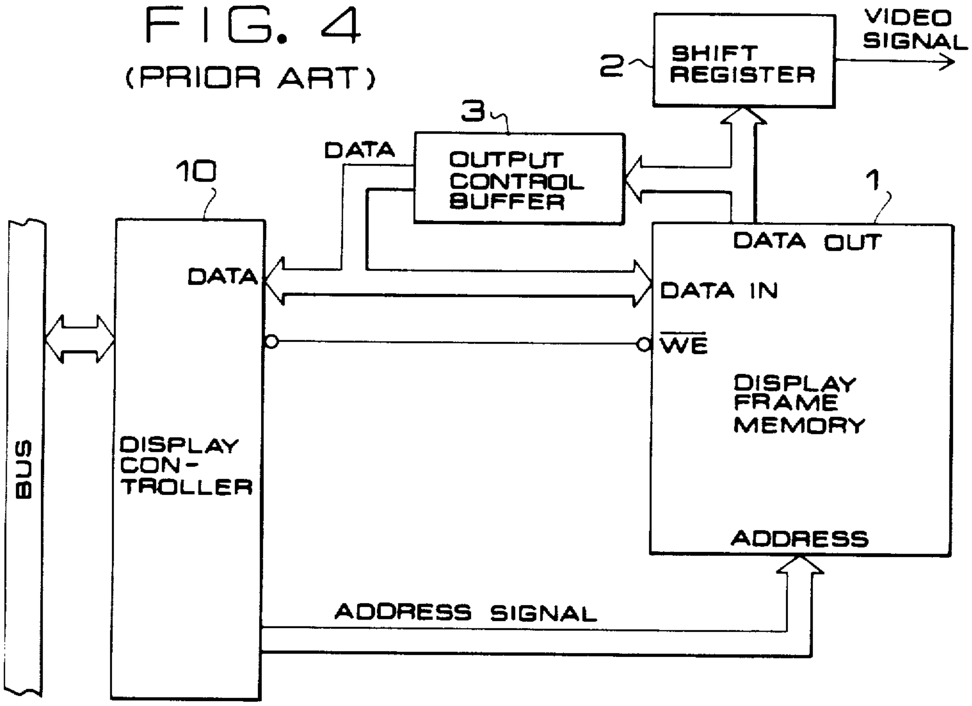
FIG. 4 (PRIOR ART)
FIGS. 4 and 5 are block diagrams respectively showing prior art writing control devices.

Now, operations of the control device for writing for a multi-window display system structured as above will be described. In the display cycle, first, the display controller 10 sends addresses for successive display data to the display frame memory 1, the data to be displayed are, as the addresses are sent, loaded from the display frame memory 1 into the shift register 2, and the data shifted in the shift register 2 according to a dot clock are output therefrom as video signals. These operations are quite the same as those in the prior art as shown in FIG. 4.

Figure 2:
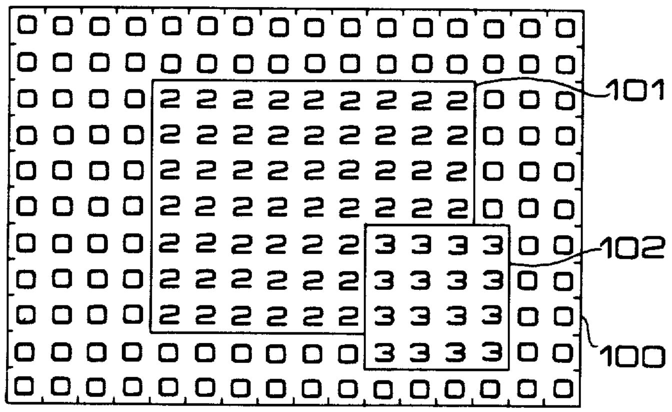
FIG. 2 is a drawing showing a surface on which a multi-window display has been made.

Then, in the write cycle, with arrangements made in advance such that the write controlling mapping buffer 50 has stored at corresponding addresses therein window identification numbers, for example, identification numbers of three window display regions 100, 101, and 102 as shown in FIG. 2, and, further, the window identification number register 51 has been set therein with a window identification number for the data to be written into the display frame memory, the display controller 10 sends the addresses where the data should be written to the display frame memory 1, takes in the data once through the output control buffer 3, and, after processing the same, sends the data into the display frame memory 1. Meanwhile, the write controlling mapping buffer 50 outputs the regional data or window identification number corresponding to the address at which the data is to be written and the window identification number register 51 outputs the window identification number in which the data is to be written. And these outputs are checked by the coincidence detector 52 to determine whether they are coincident with each other and writing of the data is allowed when an agreement is detected. If they do not agree, masking is made to the write signal to the display frame memory 1 and the writing is thereby inhibited. By the arrangement having the data about the window display areas stored in the write controlling mapping buffer 50 as described above, it has been made possible to effect an inhibiting treatment to writing into the area outside the right display window area without requiring verification of the address by means of software, and the window displaying can thus be performed more effectively and speedily.

Figure 3:
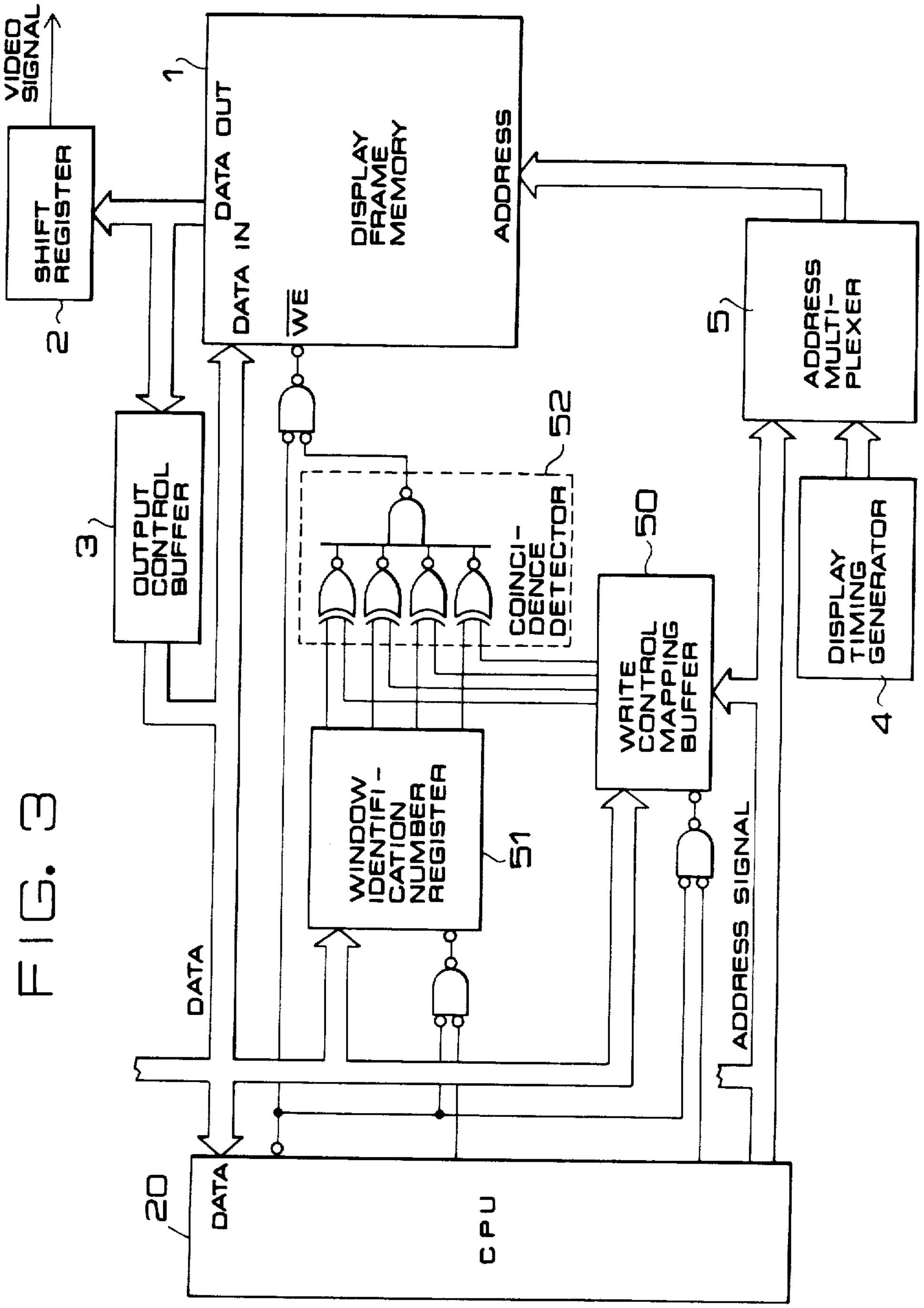
FIG. 3 is a block diagram showing another writing control device of the invention.
Figure 5:
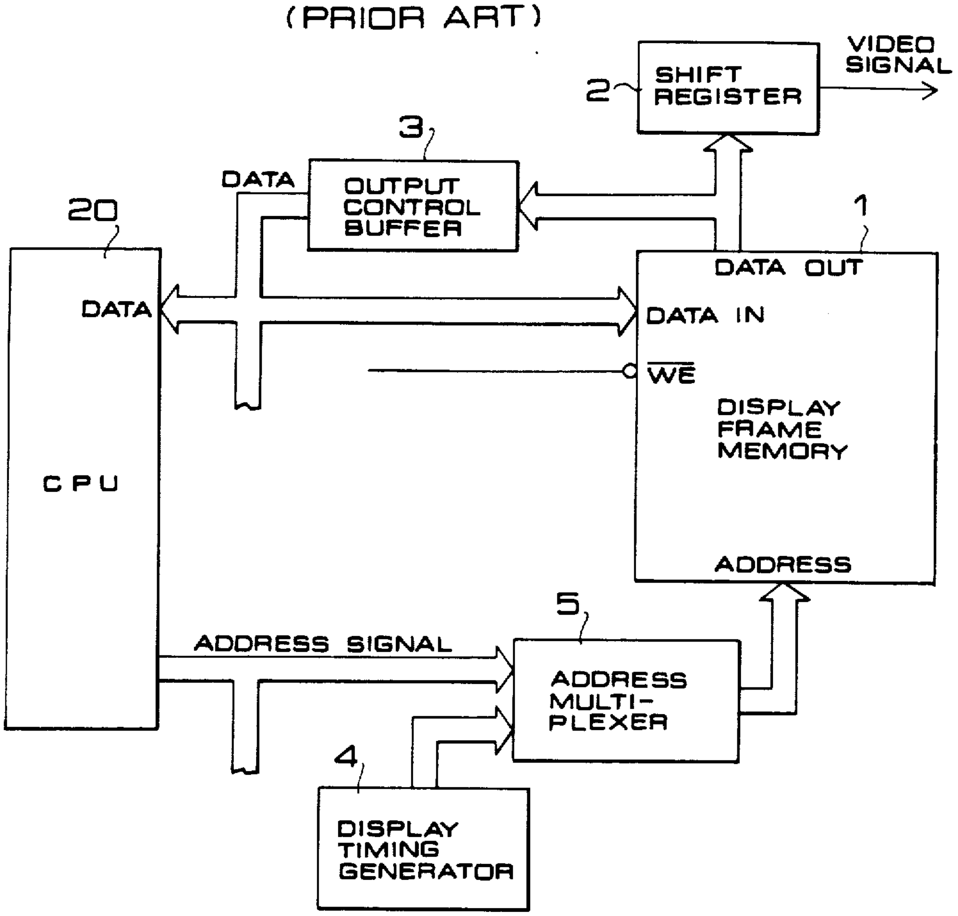
FIG. 5 (PRIOR ART)

FIG. 3 shows another writing control device according to the invention. The device of the present example includes a display timing generator 4 and an address multiplexer 5. The address multiplexer 5, in the same manner as previously described in relation to the prior art device as shown in FIG. 5, supplies the display frame memory 1 with a multiplexed signal of the address signal from the CPU 20 and the output signal of the display timing generator 4 as the address signal.

Although, in the embodiments of the invention as shown in FIGS. 1 and 3, there was indicated only one display frame memory for convenience' sake of description, it is matter of course that the display frame memories of the same number as that of the pictures simultaneously displayed on the screen are to be used. And, although the cases where the outputs of the write controlling mapping buffer 50 and window identification number register 51 are formed of four bits were illustrated, the bits of the output signal are not to be limited in number.

As apparent from the above description, the writing control device of the invention is enabled, for the reason that the software structure thereof can be made simpler, to perform treatment for multi-window displaying at a higher rate of speed, and therefore the same can be advantageously applied to a wide variety of display techniques including such techniques as character display and graphic display.

What is claimed is:

1. In a control device for writing for a multi-window display system including display controlling means and a display frame memory, wherein, in a write cycle, data is written into said display frame memory according to an address signal supplied from said display controller means, and, in a display cycle, the data which is stored at the address specified by the address signal supplied from said display controller means is output, said control device further comprising:

a write controlling mapping buffer for storing regional data about window display regions at corresponding addresses for the data to be written into said display frame memory and for outputting a corresponding window identifying number when said display controlling means outputs an address during a write cycle;

a window identification number register with a window identification number set therein corresponding to the data to be written into said display frame memory; and a coincidence detection circuit receiving the window identifying number from said write controlling mapping buffer corresponding to the address for the data to be written thereat and receiving the window identification number from said window identification number register for supplying, only when a coincidence between these two input window identification numbers is detected, said display frame memory with a signal allowing the data to be written in said frame memory.

2. A control device as claimed in claim 1 wherein said display controlling means includes a display controller.

3. A control device as claimed in claim 1 wherein said display controlling means includes a CPU.

* * * * *